US010863267B2

(12) United States Patent
Silva et al.

(10) Patent No.: US 10,863,267 B2
(45) Date of Patent: Dec. 8, 2020

(54) VOLUME CONTROL FOR AUDIO/VIDEO DEVICES

(71) Applicant: Savant Systems, Inc., Hyannis, MA (US)

(72) Inventors: Michael C. Silva, East Sandwich, MA (US); George T. Katsiris, Chatham, MA (US); Andrew R. Hamm, East Sandwich, MA (US); Christopher R. Nelson, II, Mashpee, MA (US)

(73) Assignee: Savant Systems, Inc., Hyannis, MA (US)

( * ) Notice: Subject to any disclaimer, the term of this patent is extended or adjusted under 35 U.S.C. 154(b) by 67 days.

(21) Appl. No.: 15/347,340

(22) Filed: Nov. 9, 2016

(65) Prior Publication Data

US 2017/0134872 A1    May 11, 2017

Related U.S. Application Data

(60) Provisional application No. 62/253,472, filed on Nov. 10, 2015.

(51) Int. Cl.
| | |
|---|---|
| *H03G 3/00* | (2006.01) |
| *H04R 3/00* | (2006.01) |
| *G06F 3/16* | (2006.01) |
| *H04R 27/00* | (2006.01) |

(Continued)

(52) U.S. Cl.
CPC .............. *H04R 3/00* (2013.01); *G06F 3/165* (2013.01); *H04R 27/00* (2013.01); *G06F 3/0488* (2013.01); *G06F 3/04845* (2013.01); *G06F 3/04847* (2013.01); *H04R 2227/005* (2013.01); *H04R 2430/01* (2013.01)

(58) Field of Classification Search
CPC ... H04R 29/008; G06F 3/165; G06F 3/04845; G06F 3/04847
USPC ................................ 381/104, 105, 107, 109
See application file for complete search history.

(56) References Cited

U.S. PATENT DOCUMENTS

| | | |
|---|---|---|
| 5,182,552 A | 1/1993 | Paynting |
| 7,831,054 B2 | 11/2010 | Ball et al. |
| 8,127,246 B2 | 2/2012 | Furches et al. |

(Continued)

OTHER PUBLICATIONS

Phree, "Make the world your paper", Kickstarter, Jul. 19, 2015.*

(Continued)

*Primary Examiner* — Katherine A Faley
(74) *Attorney, Agent, or Firm* — Cesari and McKenna, LLP; James A. Blanchette (57) ABSTRACT

Example techniques are provided for controlling volume of A/V devices using an improved volume control. The volume control may be implemented as a slider, where the sliding element is temporarily slid in response to user input (e.g., touched and dragged by the user), but then automatically "snaps" back to the center of the slider's range when the user input ends (e.g., is released by the user). Movement of the element from the center is interpreted as a relative volume adjustment, with the rate of volume change being proportional to the distance between the center of the range and the temporary position of the element. An indicator is provided indicating the rate, to provide user feedback. The volume control may be utilized as a master volume control in a home automation system.

13 Claims, 4 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 8,705,768 B2 | 4/2014 | Aiso et al. | |
| 8,972,858 B2 | 3/2015 | Madonna et al. | |
| 9,153,125 B2 | 10/2015 | Madonna et al. | |
| 2008/0184139 A1* | 7/2008 | Stewart | G06F 9/451 715/762 |
| 2008/0285781 A1* | 11/2008 | Aerts | H04R 25/43 381/312 |
| 2012/0057725 A1* | 3/2012 | Nakamura | H04H 60/04 381/104 |
| 2012/0223959 A1 | 9/2012 | Lengeling | |
| 2014/0075311 A1 | 3/2014 | Boettcher et al. | |
| 2014/0079247 A1 | 3/2014 | Sanders | |
| 2014/0185834 A1 | 7/2014 | Frömel et al. | |
| 2014/0193140 A1* | 7/2014 | Fliderman | H04N 5/783 386/343 |
| 2014/0253520 A1* | 9/2014 | Cueto | G06F 3/0383 345/179 |
| 2015/0227303 A1* | 8/2015 | Sudo | G06F 3/0488 715/771 |
| 2016/0070244 A1 | 3/2016 | Cipollo et al. | |

OTHER PUBLICATIONS

Baudisch, Patrick, et al., "Flat Volume Control: Improving Usability by Hiding Volume Control Hierarchy in the User Interface," CHI 2004, Apr. 24-29, 2004, Vienna, Austria, pp. 1-8.
U.S. Appl. No. 14/875,399, filed Oct. 5, 2015 by Bharat Welingkar et al. For Cloud-Synchronized Architecture for a Home Automation System, pp. 1-32.

\* cited by examiner

VOLUME CONTROL FOR AUDIO/VIDEO DEVICES

RELATED APPLICATIONS

The present application claims the benefit of U.S. Provisional Patent Application No. 62/253,472, filed on Nov. 10, 2015 by Michael C. Silva et al., titled "Volume Control for Audio/Video Devices", the content of which are incorporated by reference herein in their entirety.

BACKGROUND

Technical Field

The present disclosure relates generally to audio/video (A/V) device control and more specifically to an improved volume control for A/V devices.

Background Information

Home automation systems are becoming increasingly popular in both residential and commercial buildings. Such systems may be capable of controlling, switching data between, and otherwise interacting audio/video (A/V) devices (e.g., receivers, amplifiers, televisions, media players, etc.), as well as a wide variety of other types of devices, such as lighting devices, heating ventilation and cooling (HVAC) devices, security devices, electronic door locks, etc. Devices may be organized into a number of "rooms" that correspond to different interior portions of the building or exterior spaces associated with the building. The home automation system may provide services in each of the rooms that utilize devices associated with the room. As part of these services, audio may be played in rooms by A/V devices. Depending on the configuration of the home automation system, the same audio may be played in each of the rooms, or different audio (e.g., from different audio sources) may be played in different ones of the rooms.

Many home automation systems allow a user to control the volume of the audio being played in an individual room using a volume control presented in a graphical user interface (GUI). The nature of such volume control may vary based on the type of volume adjustment natively supported by the A/V devices being used. For example, some A/V devices may natively support discrete volume adjustment, in which volume is defined by a number of discrete levels (e.g., 1, 2, 3 ... 10; 1%, 2% 3% ... 100%; etc.). In such cases, the volume control presented in the GUI may take the form of a slider. Feedback is provided by the location of the slider, with its initial position indicating the initial volume level in the room, and its final position indicating the new volume level.

In other cases, A/V devices may natively support relative volume adjustment, in which volume of the A/V device is defined by incremental increases or decreases to an initial volume level. In such cases, the volume control presented in the GUI may take the form of + or − buttons, where the user can indicate whether the volume should be increased or decreased. Typically, no feedback is provided in the GUI as to what the current volume level is, or what the new volume level will actually be. The user simply understands it will be something higher or lower than what it currently is, depending on how many times they press the + or − buttons.

While widely used to control volume in specific rooms, conventional discrete and relative volume controls suffer a number of shortcomings. With a conventional discrete volume control, a user may have difficulty making fine adjustments to volume. When many discrete levels are mapped to a relatively small slider, even a small movement of the slider may cause a dramatic adjustment to the volume (e.g., increasing it or decreasing it by many levels). This may cause a user to easily "overshoot" their intended target, requiring repeated, often "fiddly", adjustments to obtain a desired volume level. A conventional relative volume control may perform much better for making small adjustments to volume, as a user may, for example, simply tap a + or − button a single time to make a very small adjustment. However, with a conventional relative volume control, a user may have difficulty making large adjustments to volume. If the user desires to make a significant adjustment, they be required to tap + or − buttons a great number of times. The need to press these buttons over and over again may lead to a frustrating user experience.

In addition to adjusting volume in individual rooms, some home automation systems allow a user to simultaneously adjust the volume of audio being played in all rooms. In such cases, a master volume control may be provided in the GUI. A master volume control (similar to a discrete volume control) may take the form of a slider. However, rather than represent volume level in a particular room, the position of the slider represents an "average" for multiple rooms, for example, an average of the positions of room-specific sliders for multiple rooms.

While a conventional master volume control may work acceptably for systems where all A/V device natively supported discrete volume adjustment, they typically have difficulty (or do not work at all) in systems that include A/V device that only supported relative volume adjustment. Absent feedback from an A/V device regarding what the initial volume level is, an accurate "average" cannot readily be calculated. Accordingly, the position of the slider in the in the master volume control may be misleading.

Accordingly, there is a need for an improved volume control for A/V devices that may be used as a room-specific volume control or as a master volume control. Such improved volume control may address the shortcomings of conventional discrete, relative and master volume controls, to provide an improved user experience.

SUMMARY

Example techniques are provided for controlling volume of A/V devices using an improved volume control. The volume control may be implemented as a slider, where the sliding element is temporarily slid in response to user input (e.g., touched and dragged by the user), and then automatically "snaps" back to the center of the slider's range when the user input ends (e.g., is released by the user). Movement of the element from the center is interpreted as a relative volume adjustment, with the rate of volume change being proportional to the distance between the center of the range and the temporary position of the element. An indicator is provided indicating the rate to provide feedback. The volume control may be used as a master volume control to adjust volume of A/V devices in multiple (e.g., all) rooms of a system. Alternatively, the volume control may be used for room-specific volume adjustment to adjust volume of A/V devices of a corresponding room.

In one specific example embodiment, a control application (app) executing on an electronic device (e.g., a remote control unit or a mobile device) of a home automation system presents a master volume control GUI implementing the above discussed techniques on a display screen (e.g., a touch screen) of the device for controlling one or more A/V devices. The volume control is implanted as a form of slider, with a range extending between a minimum extent and a maximum extent, and an element (e.g., a button) that is slidable within the range. The element is located at the center of the range by default, when not presently subject to user input (e.g., not touched and dragged on the touch screen), and is slidable to temporary positions located towards the minimum extent or the maximum extent of the range, when presently subject to user input (e.g., touch and dragged on the touch screen). The element is automatically returned to the center of the range when the user input is removed (e.g., the touch is released on the touch screen). In response to the element being slid to a temporary position located towards the minimum extent from the center of the range, the control app (or host software executing on a separate host controller in response to messages from the control app) issues control commands to decrease the volume of each of the one or more A/V devices at a rate proportional to a distance between the center of the range and the first temporary position. Likewise, in response to the element being slid to a second temporary position located towards the maximum extent from the center of the range, the control app (or host software executing on a separate host controller in response to messages from the control app) issues control commands to increase the volume of each of the one or more A/V devices at a rate proportional to a distance between the center of the range and the second temporary position. The rates may be shown by an indicator (e.g., using a numerical value or graphical animation) in the GUI (e.g., an indictor pop-up attached to the element). The volume control may be used with devices that natively support discreet volume adjustment by translating the applicable rate and an initial volume level to a discrete volume level to be applied to the A/V device. Likewise, the volume control may be used with devices that natively support relative volume adjustment by translating the applicable rate to a number of incremental increases or decreases to be applied to the A/V device.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "home automation system" should be interpreted broadly to encompass various types of home control, "smart home", and/or device control systems that may control devices (e.g., A/V devices, HVAC devices, lighting devices, security devices, electronic door locks, and/or other types of devices) of a building, such as a residential or commercial building. A home automation system may control a variety of different types of devices, or devices of only a particular type (e.g., only A/V devices).

As used herein, the term "A/V device" refers to an electronic device that is capable of providing an audio output, and possibly a video output. Devices such as receivers, amplifiers, televisions, media players, and the like are examples of A/V devices.

As used herein, the term "mobile device" refers to an electronic device that executes a general-purpose operating system and is adapted to be transported on one's person. Devices such as smartphones and tablet computers should be considered mobile devices. Desktop computers, servers, or other primarily-stationary computing devices generally should not be considered mobile devices.

As use herein, the term "room" refers to an interior portion of a building or an exterior space associated with a building, in which one or more services may be provided. A room may correspond to a single physical room of the building, an aggregation of multiple physical rooms of the building, a sub-portion of a physical room of the building, or a particular delineation of exterior space associated with the building.

An Example Home Automation System

Figure 1:
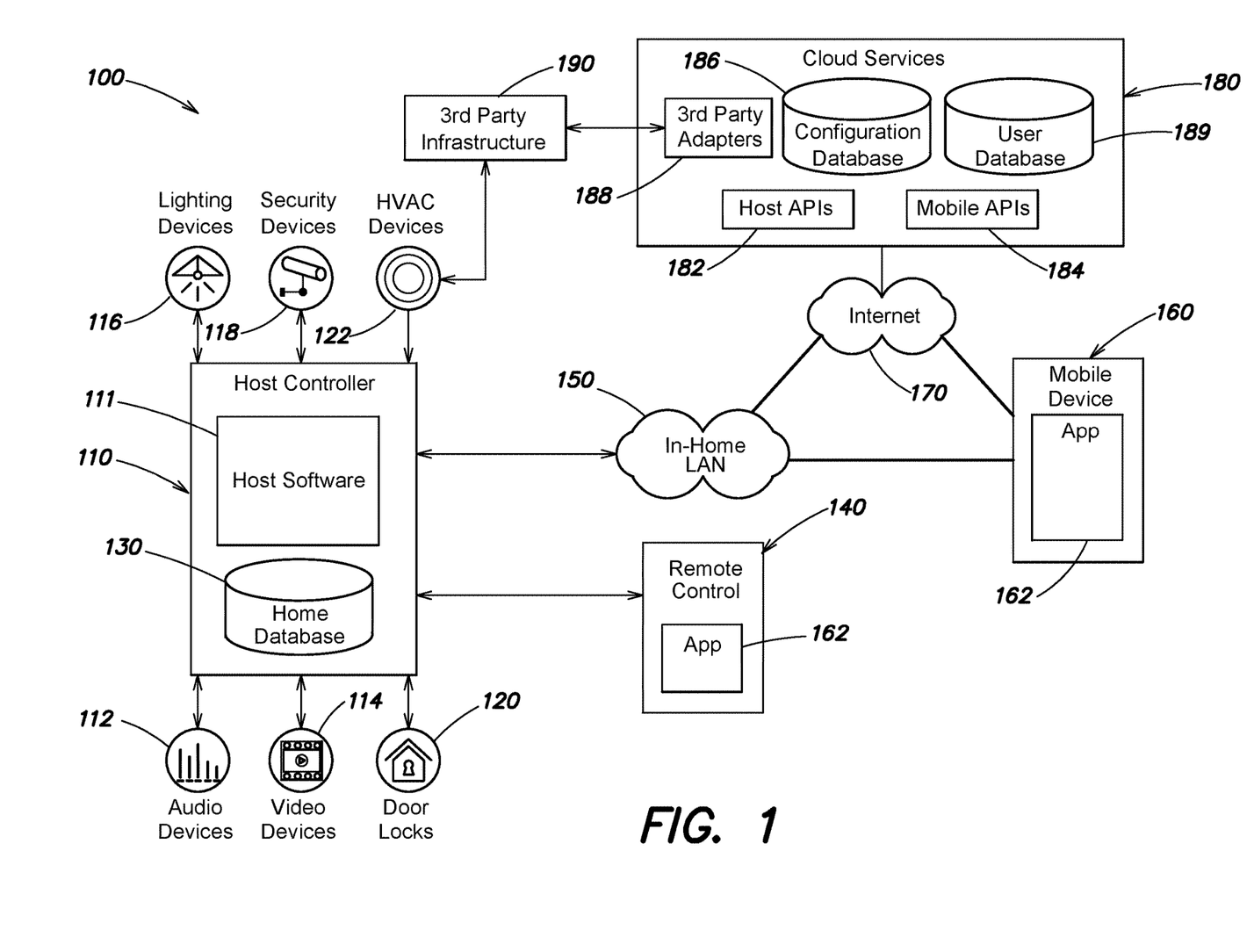
FIG. 1 is a block diagram of an example architecture of a home automation system in which the volume control described herein may be implemented.

FIG. 1 is a block diagram of an example architecture of a home automation system in which the volume control described herein may be implemented. At the core of the system is a host controller 110 coupled to an in-home local area network (LAN) (e.g., a Wi-Fi network) 150. The host controller may include hardware components such as a processor, a memory and a storage device, which collectively store and execute host software 111 configured to monitor the control the operations of devices 112-122, as well as to provide UI interpretation, system administration and monitoring, synchronization with cloud services 180, remote controls 140 and mobile devices 160, activity recording, activity prediction and other types of functionality.

The host controller 110 may maintain in its storage device a home database 130 that stores configuration information describing services the home automation system is configured to provide, user content such as scenes that are configured for a user of the home automation system, media content associated with a user of the home automation system (e.g., favorites), system state information indicating a present condition of the home automation system, as well as other types of data.

The devices 112-122 of the home automation system may include audio devices 112 and video devices 114 (collectively A/V devices), such as receivers, amplifiers, televisions, media players, and the like; lighting devices 116, such as lighting controllers, lamp modules, dimmer modules, switches, keypads, fan controllers and the like; security devices 118, such as home monitors/cameras, motion sensors, home healthcare sensors, related controllers and the like; electronic door locks 120 and other types of motor or relay operated devices; HVAC devices 122, such as thermostats, furnaces, air condition systems and the like; as well as other types of devices. Each of the devices 112-122 may be associated with (i.e. configured to be used in connection with) a room. The devices 112-122 may physically reside in the room with which they are associated, or reside elsewhere (e.g., a remote equipment rack) and simply be used with the associated room.

The devices 112-122 may be used by the home automation system to provide services, interacting in particular manners to provide activities in various rooms. Services may correspond to unique paths between devices. In the case of A/V devices, a service may involve unique audio and video paths from source devices to output devices that provide a viewing and/or listening activity. For example, a "Cable TV" service may correspond to paths between a cable box and a television that are utilized to provide a cable television activity.

Depending on the implementation, the devices 112-122 of the home automation may have different communication capabilities. For example, at least some of the devices may include a LAN interface (e.g., a Wi-Fi adaptor) and communicate via the in-home LAN 150 (e.g., Wi-Fi). Likewise, some devices may only have ports or transceivers for wired or point-to-point wireless communication (e.g., RS-232, relay or general-purpose input/output (GPIO) ports, infrared (IR) transceivers, etc.) and may communicate using such ports. Further, some devices may include a LAN interface (e.g., a Wi-Fi interface), but not be configured to communicate directly with local devices, instead communicating via third party infrastructure 190. It should be understood that while HVAC devices 122 are shown in FIG. 1 as an example of one type of device that may communicate in this manner, other types of devices 112-120 may alternatively use this method of communication, and vice versa.

Furthermore, depending on the implementation, the devices 112-122 of the home automation may have different control capabilities and may respond to different type of control commands. For example, some of the A/V devices 112-114 may be configured to natively support discrete volume adjustment, in which volume is defined by a number of discrete levels, and may respond to control commands that specify a particular volume level to adjust to. Other A/V devices 112-114 may be configured to natively support relative volume adjustment, in which volume is defined by incremental increases or decreases to an initial volume level, and the may respond to control commands that specify when to apply increases or decreases.

A user may control the home automation system using a remote control 140 that communicates with the host controller 110 (and potentially directly with devices 112-122) through the in-home LAN 150 (e.g., via Wi-Fi) or via point-to-point wireless signals (e.g. via IR or radio frequency RF signals). The remote control 140 may include hardware components such as a processor, a memory and a storage device, which store and execute software, including a control app 162. The control app 162 may generate a control GUI, among other functionality. The remote control 140 may further include a display screen (e.g., a touch screen) for showing the control GUI, and input devices (e.g., a touch sensor of the touch screen, buttons, etc.) for receiving user input related to the control GUI.

A user may further control the home automation system using a mobile device 160 that communicates with the host controller 110 via the in-home LAN 150 or using a mobile data connection to the Internet 170. The mobile device 160 may include hardware components such as a processor, a memory and a storage device, which store which store and execute software, including a control app 162. Similar to as on the remote control 140, the control app 162 on the mobile device 160 may generate a control GUI, among other functionality. The mobile device 160 may further include a display screen (e.g., a touch screen) for showing the control GUI, and an input device (e.g., a touch sensor of the touch screen) for receiving user input related to the control GUI. As explained further below, the control GUI on either the remote control 140 or the mobile device 160 may include a special volume control implemented according to the techniques described herein.

The host device 110 and mobile device 160 may communicate via the Internet 170 with cloud services 180 and its host application program interfaces (APIs) 182 and mobile APIs 184. The cloud services 180 may provide remote access to home automation control, a persistent backup of the home database 130, interfaces to third party infrastructure 190 (via third party adaptors 188), user profiles and usage tracking (storing data in user database 189), a mechanism for over-the-air updates, host crash reporting, and license management, among other functions.

A Volume Control for A/V Devices

The control app 162 executing on the remote control unit 140 or mobile device 160 may implement an improved volume control for controlling volume of A/V devices 112-114. The volume control may be displayed in a control GUI on the display screen (e.g., a touch screen) of the remote control unit 140 or mobile device 160. In response to user input on the volume control in the control GUI, the control app 162 (or the host software 111 in response to messages from the control app 162) may issue control commands to A/V devices that include discrete volume levels or a number of incremental increases or incremental decreases to an initial volume, depending on their native capabilities.

In one implementation, the volume control may take the form of a master volume control that controls the volume of A/V device of multiple (e.g. all) rooms in the home automation system. Such master volume control may be displayed in the control GUI together with a number of room-specific volume controls that each control volume of A/V devices of a corresponding room. The room-specific volume controls may be implemented as conventional discrete or relative controls, or incorporating the techniques described herein.

Figure 2A:
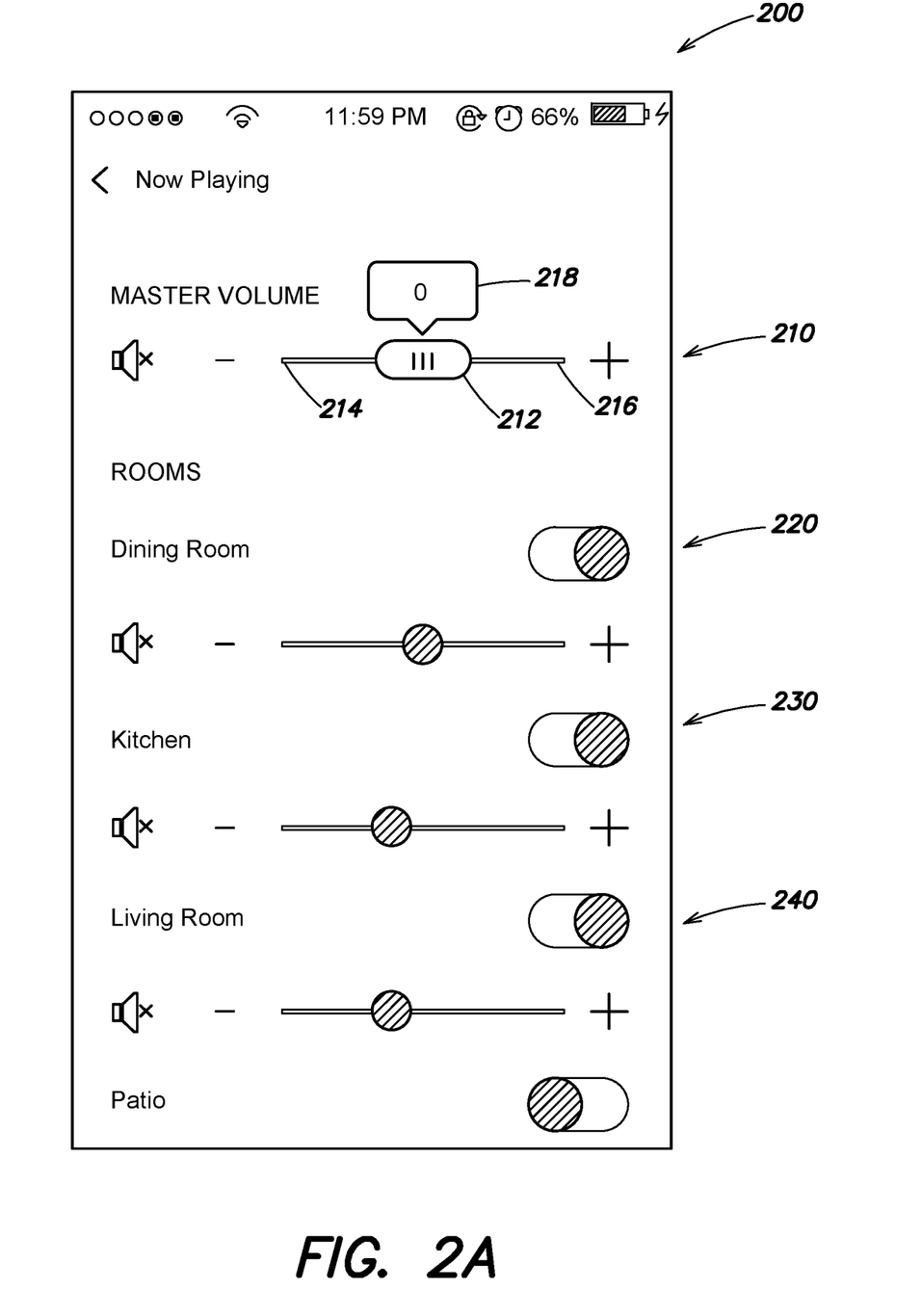
FIGS. 2A and 2B are screen shots of an example control GUI that includes a master volume control together with a number of room-specific volume controls.
Figure 2B:
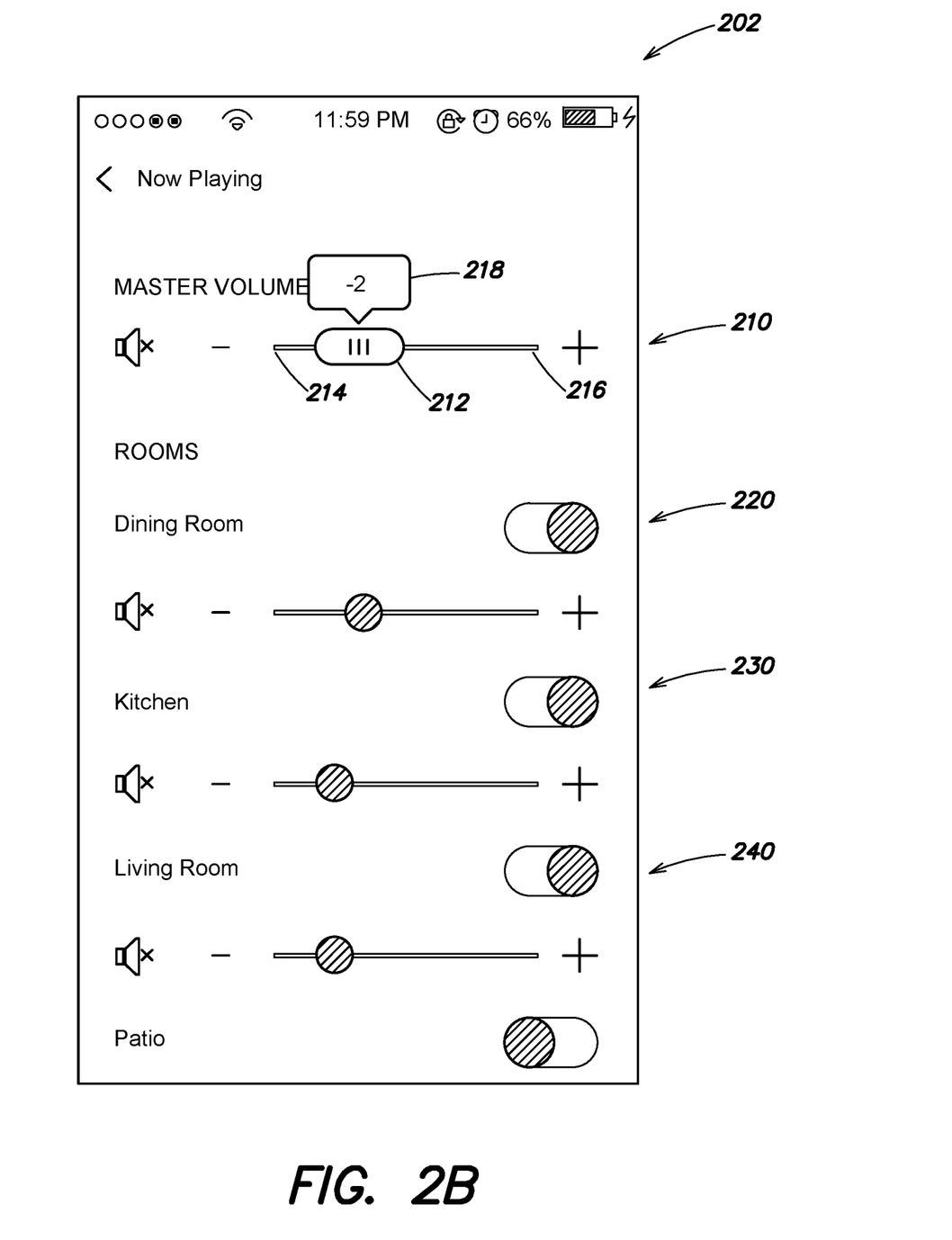

FIGS. 2A and 2B are screen shots 200, 202 of an example control GUI that includes a master volume control 210 together with a number of room-specific volume controls 220-240. The master volume control 210 is implemented as an improved volume control using the techniques described herein, and includes an element (e.g., a button) 212 that is slidable within a range between a minimum extent 214 and a maximum extent 216. The element 212 is located at the center of the range (as shown in FIG. 2A) by default, when not presently subject to user input (e.g., a touch and drag by the user on the touch screen). When presently subject to user input (e.g., when touched and dragged by the user on the touch screen) the element 212 is slidable to temporary positions located towards the minimum extent 214 (as shown in FIG. 2B) or the maximum extent 216. The control app 162 causes the element 212 to automatically return ("snap" back) to the center of the range (back to shown in FIG. 2A) when the user input is removed (e.g., the element is released by the user on the touch screen).

Movement of the element 212 from the center of the range is interpreted by the control app 162 as a relative volume adjustment, with a rate of volume change from an initial volume being proportional to the distance between the center of the range and the temporary position of the element 212. The rate of volume change is translated by the control app 162 (or is provided to the host software 111, and then translated by the host software 111, depending on the implementation) into either a discrete volume level for A/V devices that natively support discrete volume adjustment, or a number of incremental increases or incremental decrease to an initial volume for A/V devices that natively support relative volume adjustment. The discrete volume level or number of incremental increases or incremental decrease is supplied to the A/V devices in control commands (e.g., transmitted over the in-home LAN 150, or otherwise communicated to the A/V devices). An indicator 218 is provided in the volume control indicating the rate of volume change, to provide feedback to the user. The indicator may take the form of a pop-up box attached to the element 212, and show a numerical value quantifying the rate of volume change (e.g., "−2" in FIG. 2B). Alternatively, the indicator may be a graphical animation that indicates the rate of volume change (e.g., a graphic, a color change, etc.)

Figure 3:
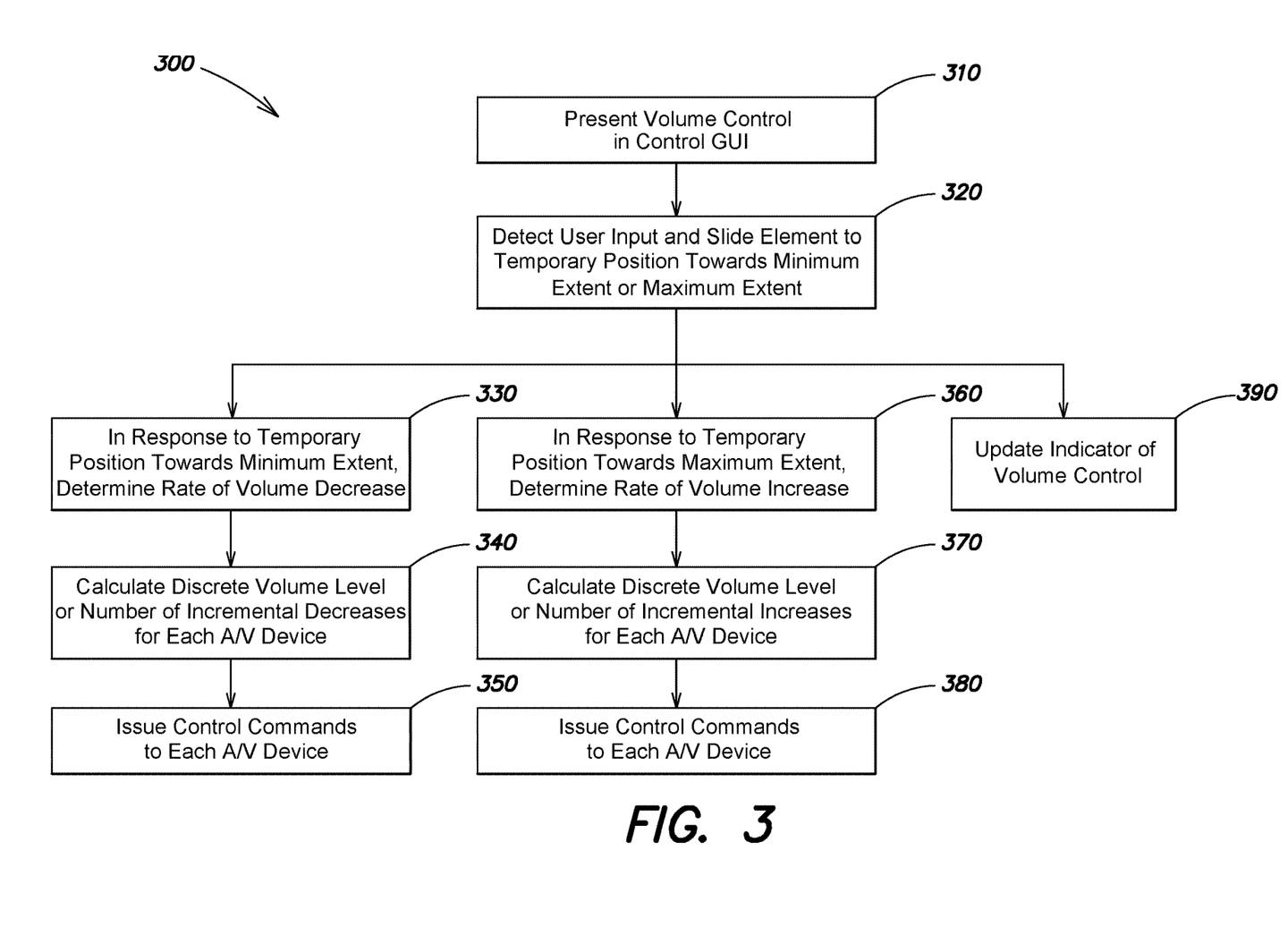
FIG. 3 is a flow diagram of an example sequence of steps that may be executed by the control app to implement an improved volume control.

FIG. 3 is a flow diagram of an example sequence of steps that may be executed by the control app 162 (alone, or in some implementations in conjunction with the host software 111) to implement an improved volume control. At step 310, the control app 162 presents the improved volume control (e.g., as a master volume control) in a control GUI on a display screen (e.g., a touch screen) of a remote control 140 or mobile device 160. At step 320, the control app 162 detects user input (e.g., a touch and drag by the user on the touch screen) and slides the element 212 to a temporary position towards the minimum extent 214 or the maximum extent 216 from the center of the range to follow the user input.

At step 330, in response to the element 212 being slid to a temporary position located towards the minimum extent 214 from the center of the range, the control app 162 determines a rate of volume decrease. At step 340, the control app 162 (or host software 111 in response to messages from the control app 162, depending on the implementation) calculates a discrete volume level for each A/V device 112-114 that natively supports discrete volume adjustment, based on the rate of volume decrease and an initial volume level of the A/V device, or a number of incremental decreases to an initial volume for each A/V device that natively supports relative volume adjustment, based on the rate of volume decrease and a mapping of rates to numbers of incremental volume changes. Then, at step 350, the control app 162 (or host software 111, depending on the implementation) issues control commands to each of the A/V devices that include the calculated discrete volume level or indication of the incremental decreases, to effectively decrease their volume at the rate of volume decrease.

Alternatively, at step 360, in response to the element 212 being slid to a second temporary position located towards the maximum extent 216 from the center of the range, the control app 162 determines a rate of volume increase. At step 370, the control app 162 (or host software 111 in response to messages from the control app 162, depending on the implementation) calculates a discrete volume level for each A/V device that natively supports discrete volume adjustment, based on the rate of volume increase and an initial volume level of the device, or a number of incremental increases to an initial volume for each A/V device that natively supports relative volume adjustment, based on the rate of volume increase and a mapping of rates to numbers of incremental volume changes. Then at step 380, the control app 162 (or host software 111 depending on the implementation) issues control commands to each of the A/V devices that include the discrete volume level or indication of the incremental increases, to effectively increase their volumes at the rate of volume increase.

At step 390, which may be performed simultaneously to steps 330-350 or 360-380, the control app 162 updates an indictor of the volume control of the GUI to provide feedback regarding the rate of volume increase or decrease (e.g., with a numerical value or graphical animation). By looking to the indicator, the user may discern how rapidly they are ramping volume up or down, and moderate their movement of the element 212 from the center of the range accordingly.

CONCLUSIONS

It should be understood that various adaptations and modifications may be made to the above discussed improved volume control for A/V devices. While embodiments discussed above involve use of the volume control as a room-specific volume control or as a master volume control in a home automation system that includes a number of rooms, it should be understood that the volume control may be used as an individual device volume control (e.g., absent a full home automation system), or as another type of volume control, as part of a variety of different types of systems or devices.

Further, while embodiments discussed above may display of the volume control in a GUI on a display screen of a mobile device or remote control unit, it should be understood that the volume control may be implemented in a GUI on a display screen of a wide range of other type of electronic devices. Alternatively, the volume control may not be a part of a GUI on a display screen, but instead may be implemented as a physical control. Such a physical control may include a physical element that may be grasp by the user and mechanically slid in a track over a range. The physical element may be spring loaded to return to the center of the range when released by the user. In many other respects, a physical implementation of the volume control may operate similarly to an implementation in a GUI.

Likewise, while embodiments discussed above involve a volume control that is implemented as a form of slider, with an element (e.g., a button) that is slidable within a range, it should be understood that the volume control may also be implemented using other forms of controls that do not rely upon linear motion. For example, the volume control may be implemented as a form of a knob, where the knob is rotatable within a rotational range that extends between a minimum extent and a maximum extent. The knob may be oriented by default to a certain position (e.g., a center position) of the rotational range, and configured to automatically return to this position when released by the user. In response to the knob being rotated to a temporary position located towards the minimum extent or the maximum extent, control commands may be issued to decrease or increase the volume of each of the one or more A/V devices at a rate proportional to the degree of rotation in the respective direction.

Further, while embodiments discussed above involve an element of a volume control that automatically returns to the center of a range when the user input is removed, it should be understood that the volume control also may allow an element to remain at the same position when user input is removed. In such implementations, distance (or rotation, as the case may be) may be measured from the prior position of an element of the volume control, rather than a predefined center.

Additionally, while it is discussed above that calculations and other processing operations utilized to implement the volume control are performed by the control app 162 (or host software 111), it should be understood that operations may be performed by other software, in hardware or using various combinations thereof. In general, software implementations may include electronic device-executable instructions (e.g., computer-executable instructions) stored in a non-transitory electronic device-readable medium (e.g., a non-transitory computer-readable medium), such as a volatile or persistent memory, a hard-disk, a compact disk (CD), or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components, for example, processors, memories, etc.

Above all, it should be understood that the above embodiments are meant to be taken only by way of example.

What is claimed is:

1. A method for controlling volume of a plurality of audio/video (A/V) devices that have different initial volume levels, wherein one or mom of the plurality of A/V devices support discrete volume adjustment and one or mom of the plurality of A/V devices support relative volume adjustment, comprising:

presenting in a graphical user interface on a display screen of an electronic device separate from the plurality of A/V devices, a master volume control that includes:
   a range having a minimum extent, a maximum extent and a center, and
   an element that is slidable within the range, the element located at the center of the range by default when not presently subject to user input, and slidable to a plurality of temporary positions located towards the minimum extent or a plurality of temporary positions towards the maximum extent of the range when presently subject to user input, the element to automatically return to the center of the range when the user input is removed;

in response to the element being slid to a first temporary position located towards the minimum extent from the center of the range, by software executing on the electronic device separate from the plurality of A/V devices, calculating a discrete volume level for each of the one or more A/V devices that support discrete volume adjustment based on a distance between the center of the range and the first temporary position and an initial volume level of a respective one of the one or more A/V devices that support discrete volume adjustment, and calculating a number of incremental volume adjustments for each of the one or more A/V devices that support n relative volume adjustment based on the distance between the center of the range and the first temporary position and an initial volume of a respective one of the one or more A/V devices that support relative volume adjustment, and decreasing the volume of each of the one or mom A/V devices that support discrete volume adjustment by instructing the respective A/V device to set the respective A/V device to the discrete volume level, and decreasing the volume of each of the one or more A/V devices that support relative volume adjustment by instructing the respective A/V device to apply the number of incremental volume adjustments to the initial volume level of the respective A/V device, and providing feedback in the graphical user interface; and in response to the element being slid to a second temporary position located towards the maximum extent from the center of the range, by software executing on the electronic device separate from the plurality of A/V devices, calculating a discrete volume level for each of the one or more A/V devices that support discrete volume adjustment based on a distance between the center of the range and the second temporary position and an initial volume level of a respective one of the one or more A/V devices that support discrete volume adjustment, and calculating a number of incremental volume adjustments for each of the one or more A/V devices that support relative volume adjustment based on the distance between the center of the range and the second temporary position and an initial volume of a respective one of the one or more A/V devices that support relative volume adjustment, and increasing the volume of each of the one or more A/V devices that support discrete volume adjustment by instructing the respective A/V device to set the respective A/V device to the discrete volume level, and increasing the volume of each of the one or more A/V devices that support relative volume adjustment by instructing the respective A/V device to apply the number of incremental volume adjustments to the initial volume level of the respective A/V device, and providing feedback in the graphical user interface.

2. The method of claim 1, wherein the feedback is an indicator that includes a numerical value indicating a first rate at which the volume of the plurality of A/V devices is decreasing or a second rate at which the volume of the plurality of A/V devices is incasing.

3. The method of claim 1, wherein the feedback is an indicator that includes a graphical animation indicating a first rate at which the volume of the plurality of A/V devices is decreasing or a second rate at which the volume of the plurality of A/V devices is increasing.

4. The method of claim 1, wherein the plurality of A/V devices are organized into a plurality of rooms, the graphical user interface includes a plurality of room-specific volume controls that each control volume of A/V devices of a corresponding mom, and the master volume control controls volume of A/V devices of all the plurality of rooms.

5. The method of claim 1, wherein the electronic device is a remote control unit or a mobile device executing a control application (app) of a home automation system.

6. The method of claim 1, wherein the display screen is a touch sensitive display screen, and the user input is to touch and drag the element on the touch sensitive display screen.

7. An electronic device usable to control volume of a plurality of audio/video (A/V) devices separate from the electronic device that have different initial volume levels, comprising:
   a touch sensitive display screen;
   a processor; and
   a memory storing software that is executable on the processor, the software including a control application (app) that when executed is operable to:
      display, in a graphical user interface shown on the touch sensitive display screen, a master volume control that includes:
         a range having a minimum extent, a maximum extent and a center, and
         an element that is slidable within the range, the element located at the center of the range by default when not presently touched by a user on the touch sensitive display, and slidable to a plurality of temporary positions located towards the minimum extent or a plurality of temporary positions located towards the maximum extent of the range when dragged by the user, the element configured to automatically return to the center of the range when released by the user, and
      in response to the element being touched and dragged to a first temporary position located towards the minimum extent from the center of the range, cause one or more control commands to be issued to the plurality of A/V devices to decrease the volume of each of the plurality of A/V devices by adjustment of A/V devices of the plurality that support discrete volume adjustment to be set to a discrete volume level, wherein the discrete volume level is calculated based on a distance between the center of the range and the first temporary position, and application of a number of incremental volume adjustments to an initial volume level of A/V devices of the plurality that support relative volume adjustment, wherein the number of incremental volume adjustments is calculated based on the distance between the center of the range and the first temporary position, and so in response to the element being touched and dragged to a second temporary position located towards the maximum extent from the center of the range cause one or more control commands to be issued to the plurality of A/V devices to increase the volume of each of the plurality of A/V devices by adjustment of A/V devices of the plurality that support discrete volume adjustment to be set to a discrete volume level, wherein the discrete volume level is calculated based on a distance between the center of the range and the second temporary position, and application of a number of incremental volume adjustments to an initial volume level of A/V devices of the plurality that support relative volume adjustment, wherein the number of incremental volume adjustments is calculated based on the distance between the center of the range and the second temporary position.

8. The electronic device of claim 7, wherein the plurality of A/V devices are organized into a plurality of rooms, the graphical user interface includes a plurality of room-specific volume controls that control volume of A/V devices of corresponding rooms, and the master volume control controls volume of A/V devices of all the plurality of rooms.

9. A non-transitory electronic device readable medium having instructions stored thereon, the instruction when executed by one or mom electronic devices operable to:
  receive user input on a control that includes an element that is movable within a range from an initial position to a plurality of temporary positions located towards a minimum extent from the initial position or a plurality of temporary positions located towards a maximum extent from the initial position when presently subject to user input, the element to automatically return to the initial position when the user input is removed; and
  in response to the element being moved to a rust temporary position located towards the minimum extent from the initial position, decrease the volume of each of a plurality of A/V devices by instructing A/V devices of the plurality that support discrete volume adjustment to set a discrete volume level, wherein the discrete volume level is calculated based on a distance between the initial position and the rust temporary position, and instructing A/V devices of the plurality that support relative volume adjustment to apply a number of incremental volume adjustments to an initial volume level, wherein the number of incremental volume adjustments is calculated based on the distance between the initial position and the first temporary position; and
  in response to the element being moved to a second temporary position located towards the maximum extent, increase the volume of each of the plurality of A/V devices by instructing A/V devices of the plurality that support discrete volume adjustment to set a discrete volume level, wherein the discrete volume level is calculated based on a distance between the initial position and the second temporary position, and instructing A/V devices of the plurality that support relative volume adjustment to apply a number of incremental volume adjustments to an initial volume level, wherein the number of incremental volume adjustments is calculated based on the distance between the initial position and the second temporary position.

10. The non-transitory electronic device readable medium of claim 9, wherein the element is a slider that is slidable within a linear range from the initial position towards the minimum extent or the maximum extent.

11. The non-transitory electronic device readable medium of claim 9, wherein the element is a knob that is rotatable within a rotational range from the initial position towards the minimum extent or the maximum extent.

12. A method for controlling volume of a plurality of audio/video (A/V) devices that have different initial volume levels, wherein one or mom of the plurality of A/V devices support discrete volume adjustment and one or mom of the plurality of A/V devices support relative volume adjustment, comprising:
  receiving, by an electronic device separate from the plurality of A/V devices, user input on a control that includes an element that is movable within a range from an initial position to a plurality of temporary positions located towards a minimum extent from the initial position or a plurality of temporary positions located towards a maximum extent from the initial position when presently subject to user input, the element to automatically return to the initial position when the user input is removed;
  determining, by the electronic device, based on a distance between the initial position and the first temporary position or second temporary position a rate of volume change;
  translating the rate of volume change to a discrete volume level to be set to for each A/V device of the plurality that supports discrete volume adjustment, and to a number of incremental volume adjustments to be applied to an initial volume for each A/V device of the plurality that supports relative volume adjustment; and
  providing, by the electronic device to each of the plurality of A/V devices, the discrete volume level or number of incremental volume adjustments to change volume of both the A/V devices that support discrete volume adjustment and the A/V devices that support relative volume adjustment in response to the user input on the control.

13. The method of claim 12, wherein the element is a slider that is slidable within a linear range from the initial position towards the minimum extent or the maximum extent.

* * * * *

UNITED STATES PATENT AND TRADEMARK OFFICE
CERTIFICATE OF CORRECTION

PATENT NO. : 10,863,267 B2
APPLICATION NO. : 15/347340
DATED : December 8, 2020
INVENTOR(S) : Michael C. Silva et al.

Page 1 of 2

It is certified that error appears in the above-identified patent and that said Letters Patent is hereby corrected as shown below:

In the Specification

Column 5, Line 35:
Delete "and the may respond to control commands that specify when"
Insert --and they may respond to control commands that specify when--

Column 3, Line 27:
Delete "value or graphical animation) in the GUI (e.g., an indictor"
Insert --value or graphical animation) in the GUI (e.g., an indicator--

Column 7, Line 64:
Delete "indictor of the volume control of the GUI to provide"
Insert --indicator of the volume control of the GUI to provide--

In the Claims

Column 9, Line 15:
Claim 1:
Delete "levels, wherein one or mom of the plurality of A/V devices"
Insert --levels, wherein one or more of the plurality of A/V devices--

Column 9, Line 16:
Claim 1:
Delete "support discrete volume adjustment and one or mom of the"
Insert --support discrete volume adjustment and one or more of the--

Column 9, Line 45:
Claim 1:
Delete "that support n relative volume adjustment based on the"
Insert --that support relative volume adjustment based on the--

Signed and Sealed this
Tenth Day of August, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,863,267 B2

Column 9, Line 50:
Claim 1:
Delete "of the one or mom A/V devices that support discrete"
Insert --of the one or more A/V devices that support discrete--

Column 10, Line 24:
Claim 2:
Delete "plurality of A/V devices is incasing."
Insert --plurality of A/V devices is increasing.--

Column 10, Line 34:
Claim 4:
Delete "corresponding mom, and the master volume control controls"
Insert --corresponding room, and the master volume control controls--

Column 11, Line 16:
Claim 7:
Delete "so in response to the element being touched and"
Insert --in response to the element being touched and--

Column 11, Line 42:
Claim 9:
Delete "executed by one or mom electronic devices operable to:"
Insert --executed by one or more electronic devices operable to:--

Column 11, Line 51:
Claim 9:
Delete "in response to the element being moved to a rust tempo-"
Insert --in response to the element being moved to a first tempo- --

Column 11, Line 58:
Claim 9:
Delete "initial position and the rust temporary position, and"
Insert --initial position and the first temporary position, and--

Column 12, Line 27:
Claim 12:
Delete "levels, wherein one or mom of the plurality of A/V devices"
Insert --levels, wherein one or more of the plurality of A/V devices--

Column 12, Line 28:
Claim 12:
Delete "support discrete volume adjustment and one or mom of the"
Insert --support discrete volume adjustment and one or more of the--